US008698667B2

(12) United States Patent
Aragones et al.

(10) Patent No.: US 8,698,667 B2
(45) Date of Patent: Apr. 15, 2014

(54) DEVICE FOR COUNTERING AND TRACKING A THREAT IN THE FORM OF A HOMING-HEAD MISSILE

(75) Inventors: Julien Aragones, Antony (FR); François Dufresne De Virel, Paris (FR); Jacques Robineau, La Ville du Bois (FR)

(73) Assignee: Sagem Defense Securite, Paris (FR)

( * ) Notice: Subject to any disclaimer, the term of this patent is extended or adjusted under 35 U.S.C. 154(b) by 1239 days.

(21) Appl. No.: 11/885,093

(22) PCT Filed: Feb. 22, 2006

(86) PCT No.: PCT/EP2006/060191
§ 371 (c)(1),
(2), (4) Date: Sep. 25, 2009

(87) PCT Pub. No.: WO2006/089916
PCT Pub. Date: Aug. 31, 2006

(65) Prior Publication Data
US 2011/0006222 A1    Jan. 13, 2011

(30) Foreign Application Priority Data

Feb. 23, 2005 (FR) ..................................... 05 01833

(51) Int. Cl.
*H04K 3/00*     (2006.01)
*G01S 7/495*    (2006.01)
*G01S 17/74*    (2006.01)
*G01S 7/00*     (2006.01)
*G01S 17/00*    (2006.01)

(52) U.S. Cl.
USPC ............... 342/14; 342/13; 244/3.1; 244/3.15; 244/3.16; 398/39; 455/1

(58) Field of Classification Search
USPC ........ 244/3.1–3.3; 89/1.11; 342/5–20; 455/1; 398/39
See application file for complete search history.

(56) References Cited

U.S. PATENT DOCUMENTS

| | | | | |
|---|---|---|---|---|
| 3,956,729 A | * | 5/1976 | Epstein et al. | 342/15 |
| 4,143,263 A | * | 3/1979 | Eichweber | 342/6 |
| 4,183,482 A | * | 1/1980 | Jozwiak | 244/3.16 |
| 4,328,496 A | * | 5/1982 | White | 342/15 |
| 4,397,429 A | * | 8/1983 | Fouilloy | 244/3.11 |
| 4,407,464 A | * | 10/1983 | Linick | 244/3.13 |
| 4,808,999 A | * | 2/1989 | Toman | 342/15 |
| 5,136,295 A | * | 8/1992 | Bull et al. | 342/15 |
| 5,206,502 A | | 4/1993 | Gardner | |
| 5,786,786 A | * | 7/1998 | Small | 342/13 |

(Continued)

FOREIGN PATENT DOCUMENTS

| | | |
|---|---|---|
| FR | 2535467 | 5/1984 |
| FR | 2821929 | 9/2002 |

*Primary Examiner* — Bernarr Gregory
(74) *Attorney, Agent, or Firm* — Blakely Sokoloff Taylor & Zafman

(57) ABSTRACT

The invention concerns a device for countering and tracking a threat in the form of a homing-head missile, comprising a homing head adapted to receive an incident coherent light beam and to deflect same to produce a transmitted beam. The invention is characterized in that the homing head comprises a biprism including two prisms made of different materials and adapted to divide the transmitted beam into two sub-beams, the refractive index difference between the prisms being adapted to introduce an optical path difference between the two sub-beams which is greater than the coherence length of the incident beam.

10 Claims, 4 Drawing Sheets

(56) References Cited

U.S. PATENT DOCUMENTS

| | | | |
|---|---|---|---|
| 6,196,497 B1 * | 3/2001 | Lankes et al. | 244/3.17 |
| 6,343,767 B1 * | 2/2002 | Sparrold et al. | 244/3.16 |
| 6,371,405 B1 * | 4/2002 | Sallee et al. | 244/3.16 |
| 6,384,765 B1 * | 5/2002 | Sjostrand et al. | 342/15 |
| 6,410,897 B1 | 6/2002 | O'Neill | |
| 7,378,626 B2 * | 5/2008 | Fetterly | 244/3.1 |
| 7,692,126 B2 * | 4/2010 | Aragones et al. | 244/3.1 |

\* cited by examiner

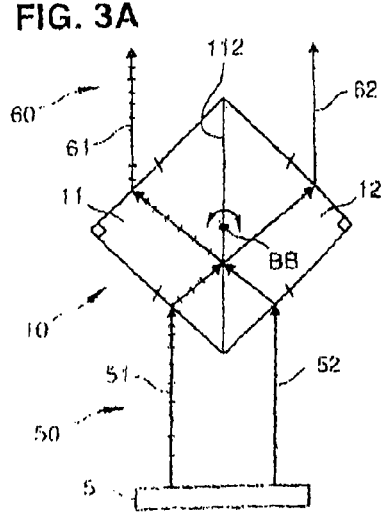
FIG. 3A
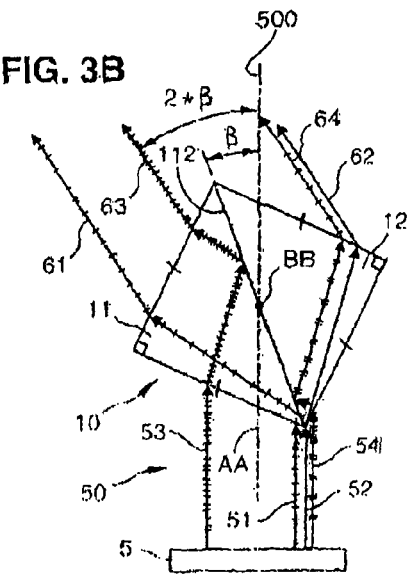
FIG. 3B
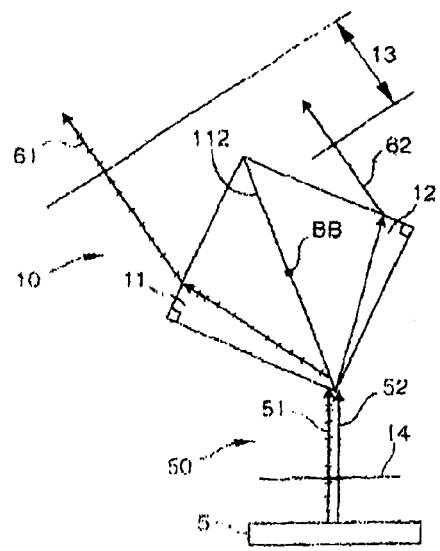
FIG. 4
FIG. 5A
FIG. 5B

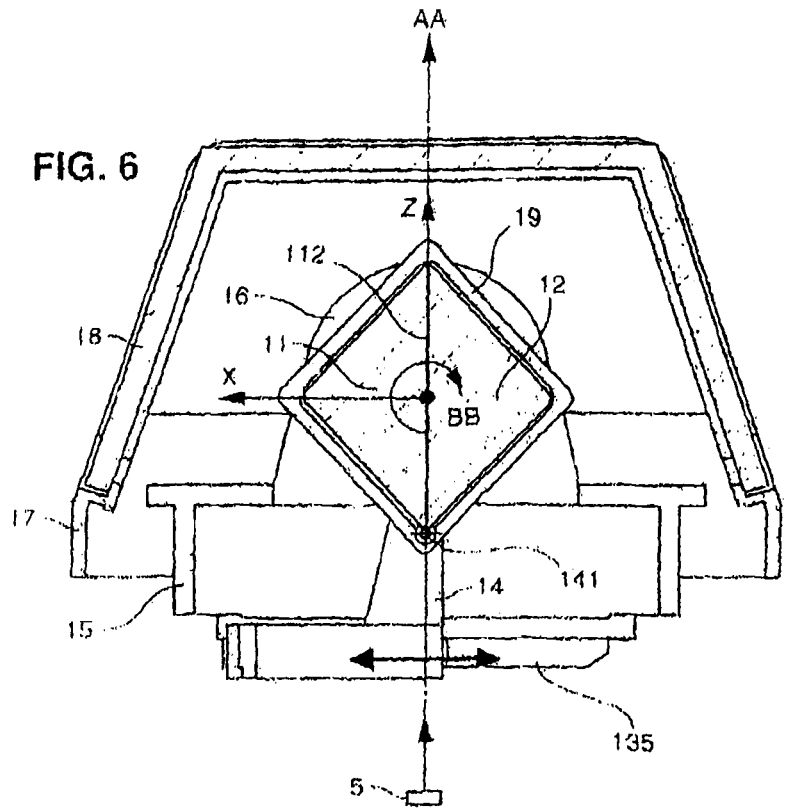
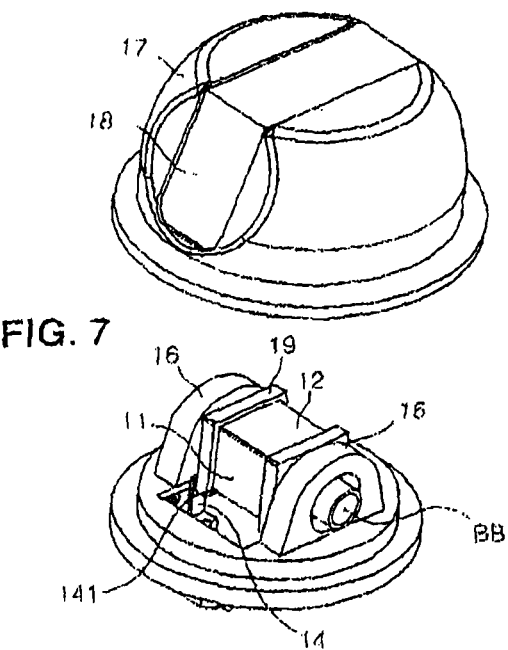
FIG. 6
FIG. 7
FIG. 8

DEVICE FOR COUNTERING AND TRACKING A THREAT IN THE FORM OF A HOMING-HEAD MISSILE

The present patent application is a non-provisional application of International Application No. PCT/EP2006/060191, filed Feb. 22, 2006.

BACKGROUND OF THE INVENTION

1. Field of the Invention

The present invention relates to an improved device for countering and tracking a threat and directed counter-measures.

More precisely, it relates to a device for tracking and countering a threat in the form of an infrared homing-head missile (IRHHM).

2. Description of Related Art

FIG. 1 schematically illustrates a known pyrotechnic counter-measure device 3 protecting for example an aircraft 1 from a threat 2. The threat 2 presents in the form of an infrared homing-head missile (IRHHM).

The device 3 is a pyrotechnic decoy generating infrared radiation when fired from the aircraft 1 whenever the latter has detected the threat 2. The infrared radiation generated by the decoy 3, which is more intense than the infrared radiation generated by the aircraft 1, causes deviation of the trajectory of the threat 2 by perturbation of the system guiding homing head of the missile. The threat 2 veers towards the decoy 3 rather than towards the aircraft 1.

Pyrotechnic decoy devices have disadvantages, however.

First, they are cumbersome in design. Also, they represent a fire risk inside the aircraft should they malfunction. In addition, in the event of a false alarm, they considerably compromise the furtive state of the aircraft 1. Finally, they exist in limited quantity only on board the aircraft, and would no longer protect the aircraft which they have been depleted on a mission. Thus they represent consumable devices needing to be replaced regularly and are highly specialised to a certain type of threat.

Consequently, current counter-measure devices are generally infrared illumination jammers.

FIG. 2 schematically illustrates a known directional infrared counter-measure device (DIRCM—Directional InfraRed Counter-Measures).

The aircraft 1 comprises a device for detecting the lift-off of missiles (MWS—Missile Warning System) in the form of a plurality of detectors 6 mounted on the fuselage of the aircraft 1. The detectors 6 detect the launch of a missile 2, tracking the trajectory of the missile and identifying it as a threat to the aircraft 1.

A control device 7 of the launch detection device transmits data on the trajectory of the missile 2 to the control device 8 of a directional counter-measure system.

The control system 8 then initiates the tracking device 4 which tracks the missile and determines its direction in space. The tracking device detects the homing head of the missile 2 by using, for example, the cat's eye effect. The focal plane of the homing head is generally a plane with high reflection coefficient and also cooled, at the same time placed au foyer of the optics for focussing onto this detection plane the signals useful for guiding the missile. The consequence of this in the event of illuminating the homing head, is to send a strong signal towards the light source (such as those sent by the eyes of a cat when illuminated by car headlights, hence the term cat's eyes) and/or in the case of thermal detection to have a cold and extensive object, corresponding to the detection surface of the homing head, an object easily detectable by an infrared camera. This problem is familiar to the specialist under the name of pointed optical detection.

In order to track the missile 2 the tracking device 4 can, if fitted with a thermal camera, detect the cool image produced by the homing head and zero in on it. The tracking device 4 can also emit a light beam 40 in the direction of the homing head of the missile 2 and utilise the signal obtained in return to make this control in direction.

The control device 8 also directs a jamming light beam 50 having an angular opening γ and produced by a source of infrared light 5. The light source 5 generally uses infrared discharge lamps, whereof spectrum has wavelengths covering a wide spectral field, from the visible to the distant infrared. Once tracking is correctly carried out and the missile is in the beam of the light source 5, the infrared illumination 50 is sent towards the homing head of the missile 2 according to a specific sequence to carry out jamming of the missile 2, such that it no longer constitutes a threat to the aircraft 1. The interference signal 50 can be the same as the tracking signal 40.

The discharge light sources 5 have numerous disadvantages.

Due to the spread of the light source, the concentration of the beam requires a bulky optical device (large pupil, large focus) which is very cumbersome and heavy. Jammers based on discharge lamps are therefore difficult to stow on board aircrafts. Also, the available light power is not very significant, and severely limits the efficacy of such jammers utilising discharge lamps.

Accordingly, with the evolution of technology, it is now possible to obtain infrared laser sources emitting wavelengths of between 3 and 5 micrometers. This evolution in technology brings a significant improvement in tracking and counter-measure devices. In fact, with a laser source, it is possible to substantially boost the intensity of the beam 50 and/or 40 with a source much smaller than a discharge source and closer to the diffraction limit. Due to the fact that the laser source is a coherent source, all the energy of the beam is concentrated on a single wavelength.

There are advantages to boosting the power of the beam on one or more given wavelengths.

A laser beam deposits greater illumination than that of discharge lamps in pupil entry of the homing head of the threat.

Laser energy can be contained in several rays (typically two or three) to be able to effectively light up all types of missile homing heads.

Due to its optical properties (strong luminance, weak divergence), the laser is well adapted to this type of device. To further reduce this divergence and obtain a balanced scope acceptable for functions of active tracking, AD identification and jamming of the DIRCM, optics known as collimation can be utilised. The function of this optics of afocal type is to reduce the divergence according to its enlargement ratio, and at the same time increase the section of the beam in an inverse ratio.

A laser beam can be reflected to a greater degree by the "search head", such that identification of the missile 2 especially by the modulation it introduces to the reflected laser beam is facilitated. Proper identification of the threat helps send a clear jamming code, that is, a code truly adapted to the type of missile 2. The source is highly directive, and this heightens the general furtive state of the aircraft.

Tracking and counter-measure devices utilising a laser source have disadvantages, however.

Due to the fact of low divergence of the beam laser produced by the laser source (in general less than 1 milliradian), the tracking device 4 must be capable of very precisely tracking the infrared detector of the missile 2.

In addition, the coherent characteristic of the laser sources imposes the use of a beam shaping, orientation and stabilisation device which does not generate interference which might have harmful consequences on the general functioning of the system and particularly on the jamming efficacy of the homing head of the missile.

It is therefore very difficult to design a tracking and counter-measure device which can rapidly and simply follow the missile in the event of using an infrared laser source.

BRIEF SUMMARY OF THE INVENTION

The invention proposes to eliminate at least one of these disadvantages.

For this purpose, the invention proposes a counter-measure and tracking device for a threat in the form of a homing-head missile, comprising an orientation head for receiving an incident coherent light beam and deviating it to produce a transmitted beam, characterised in that the orientation head comprises a biprism including two prisms made of different materials and suited to dividing the transmitted beam into two sub-beams, the refractive index difference between the prisms being suitable for introducing an optical path difference between the two sub-beams which is greater than the coherent length of the incident beam, so as to render the two sub-beams mutually non-coherent and thus prevent any interference between these two sub-beams.

The invention is advantageously completed by the following characteristics, taken singly or in any technically possible combination:
- the prisms have a right-angle isosceles triangle base;
- the refractive index difference between the prisms is substantially greater than 1;
- the couple of materials for the prisms is selected from the couples silicon—ZnS or silicon sapphire or germanium—ZnS or germanium—ZnSe or germanium—CdTe or germanium—sapphire;
- the difference in thermal dilation coefficient between the prisms is less than 0.02.
- the biprism is mounted in rotation in elevation about an axis perpendicular to its base and passing through its geometric centre;
- the biprism is mounted on a support mobile in rotation about the axis of rotation in elevation in a fork;
- the head is mounted in azimuth rotation about an axis parallel to the base of the biprism and passing through the geometric centre of the biprism;
- a protective hood of the biprism is mounted mobile in azimuth rotation; and
- the device comprises an infrared laser source of coherent length of the order of magnitude of a centimeter.

The invention has countless advantages.

The tracking 4 and counter-measure 5 devices of the prior art can be combined in the invention. Using a single laser source tracking and counter-measure can be conducted due to the power of the beam. The light source is unique and small in size. A device according to the invention is highly compact, increasing the furtive state of the device and of the assembly on which it is mounted.

The invention solves the problem of interference dues to joint utilisation of a coherent light source and an orientation head comprising a biprism generating different optical paths for beams of a laser beam passing through it. The orientation head is compatible with laser sources of minor coherent length (typically a few centimeters).

The orientation head cause very few losses in laser power.

The orientation head is very simple to produce and use. There are few or no necessary adjustments.

They include no dead angle, and especially allow zenith sight. It covers an orientation space at least equal to $2\pi$ steradians.

Also, the mechanical arrangement of the orientation head is symmetrical about its axes of use. The centre of gravity of the head is therefore located on the axes of use. The head can therefore better resist vibrations from a structure on which it is mounted. The head itself does not cause vibrations or destabilisation of the line of sight.

Finally, displacement of the head is very rapid due to reduced inertia and appropriate motorisation. The counter-measure device according to the invention requires no motorisation other than that enabling it to move the biprism.

BRIEF DESCRIPTION OF THE DRAWINGS

Other characteristics, aims and advantages of the invention will emerge from the following description, which is purely illustrative and non-limiting, and which must be viewed together with the attached diagrams, in which:

FIGS. 3A and 3B schematically illustrate the trajectory of optical beams inside an orientation head according to the invention;

FIG. 4 schematically illustrates the generation of a difference in pitch between two optical beams passing through an orientation head according to the invention;

FIGS. 5A to 5D illustrate the sub-pupils in the orientations of the head corresponding to FIGS. 3A and 3B;

FIG. 6 schematically illustrates a sectional view of a possible embodiment of an orientation head according to the invention;

FIG. 7 schematically illustrates a perspective and exploded view of an embodiment of an orientation head according to the invention;

FIG. 8 schematically illustrates the assembly of two tracking and counter-measure devices according to the invention on an aircraft 1.

In all the figures, similar elements bear the same reference numerals.

DETAILED DESCRIPTION OF THE INVENTION

Figure 1:
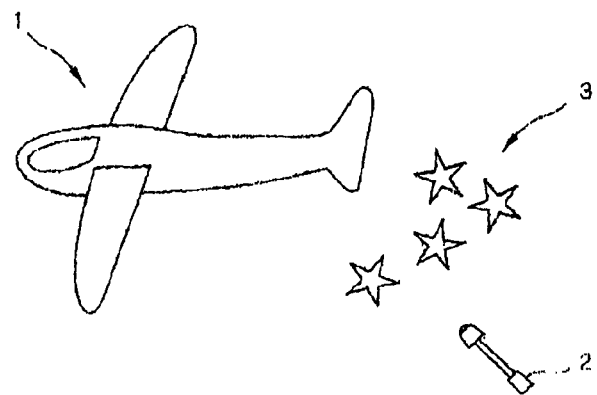
FIG. 1, already explained, schematically illustrates a known pyrotechnic counter-measure device, FIG. 2, already explained, illustrates a known device of the prior art both for tracking and for counter-measure of a threat in the form of an infrared homing-head missile.
Figure 2:
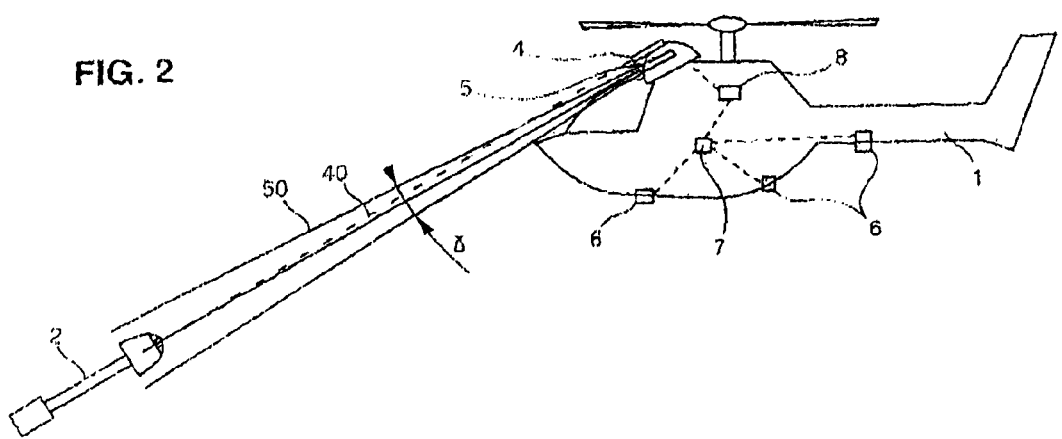

FIGS. 3A and 3B show that an improved counter-measure and tracking device for threats according to the invention comprises an orientation head of an incident laser beam 50 coming from a laser source 5.

Throughout the present description a single trajectory direction of the light beams is presented for reasons of clarity. According to the principle of inverse return of light, it is understood that the beams can be moved in the inverse direction to that shown, and that the orientation head can therefore serve at the same time as both tracking and counter-measure of the threat.

The laser source 5 is preferably an infrared laser source. Advantageously, the laser source 5 has a relatively low coherent length (typically a few centimeters).

The orientation head is adapted to receive the incident light beam 50 and deflect it to produce a transmitted beam 60.

For this purpose, the head chiefly comprises two prisms 11 and 12 forming a biprism 10. The prisms 11 and 12 have a base forming a right-angle and isosceles triangle. They are attached to one another on a face 112 arising from the hypotenuse of their base forming a right-angle triangle. The biprism 10 therefore forms a cube.

Figure 9:
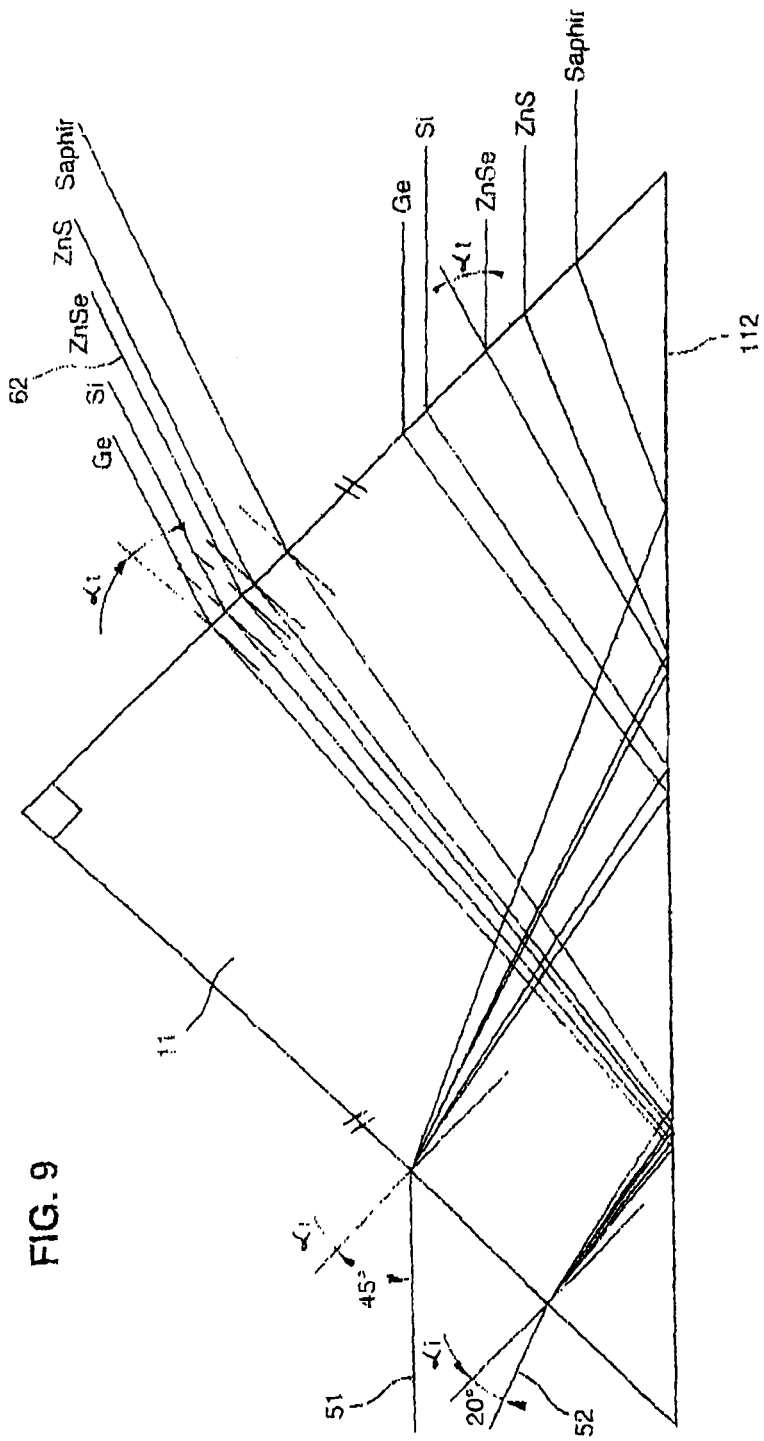
FIG. 9 schematically illustrates the trajectory of two light beams in a prism, as a function of the refraction index of the prism and their angle of incidence on the prism.

FIG. 9 shows more precisely the trajectory of light beams 51 and 52 through a prism 11, for example for giving transmitted beams 61 and 62 respectively. The fact that each prism has an isosceles base ensures that the angle at for the transmitted beam 61 is equal to the angle αi for the incident beam 51, just as the angle at for the transmitted beam 62 is equal to the angle αi for the incident beam 52. The fact that the base is right-angled ensures both the symmetry for the two prisms 11 and 12 and also that a set of incident parallel beams on the biprism emerges from the biprism in parallel.

The face 112 separates the biprism 10 into two equal parts and forms a diopter reflecting the beams of the incident laser beam 50, then passing into the prisms 11 and 12. FIG. 3A shows the trajectory of two incident beams 51 and 52 in the biprism 10. It is evident that the beams 51 and 52 are fully reflected by the face 112. The beams 51 and 52 are transmitted and referenced by 61 and 62 respectively after the biprism 10. The hypotenuse is the same length for the two prisms, to avoid reflections and losses of useful beam on the face 112 for certain orientations of the biprism, as will be evident hereinbelow in the present description.

The face 112 must be reflecting for the two prisms. This can be achieved in two different ways.

The first way is to spread, but sufficiently slightly, the two prisms away from one another, such that the conditions of total reflection (n·sin(αi)≥1) are respected and that the reflection is not prevented due to the presence of the other prism (this means total frustrated reflection or optical tunnel effect). It has the advantage of simplicity, absence sensitivity to processing degradations (since there are none) and easier assembly of the biprism (there are no constraints on the thermal dilation coefficients of the two materials as will be evident hereinbelow in the present description). It has the disadvantage of having to spread the prisms and therefore have a bob-useful zone at the centre of the optical beam.

The second way is to stick the prisms together. It is then necessary to deposit on each prism face a reflecting treatment functioning for the wavelengths in question. It has far less problem in central blackout. On the contrary, it has the disadvantages of possible degradation of the reflecting treatment and constraints on the dilation coefficients of the two prisms (in case of adhesion). An assembly of the prisms simply stacked on one another is also feasible, where one could be slid relative to the other in the event of thermal variation. Using a fine strip of low-index material, such as glass for example, is also feasible, with Si and Ge for example as a couple of materials, the two primes being placed on the fine strip, the low index of the material being compatible with total refraction conditions inside the two prisms 11 and 12.

The biprism 10 is mounted in rotation about an axis of rotation BB perpendicular to the base of the biprism, namely perpendicular to the plane of FIGS. 3A and 3B, and passing through the geometric centre of the biprism. The axis BB allows rotation of the biprism 10 in the plane of FIGS. 3A and 3B, and therefore orientation of the beam 60 in elevation.

FIG. 3B shows that rotation of an angle β of the biprism about the axis BB allows rotation of the transmitted beam 60 at an angle of 2β. FIG. 3B accordingly shows the trajectory of four incident beams 51, 52, 53 and 54, the beams 61, 62, 63 and 64 being the transmitted beams. With rotation of the biprism 10 by a value of at least 45° on each side of the optical axis 500, the head can cover an angle in elevation at least equal to 180°.

FIG. 4 shows that rotation of the biprism 10 about the axis BB causes phase advance due to the difference 13 in optical course between the two beams 61 and 62 transmitted by the prisms 11 and 12 respectively. The difference in pitch 13 is counted relative to the phase reference 14 upstream of the biprism 10 on the incident beams 51 and 52.

Figure 5C:
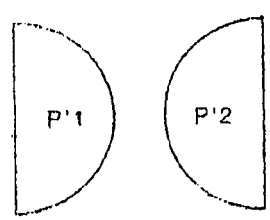
Figure 5D:
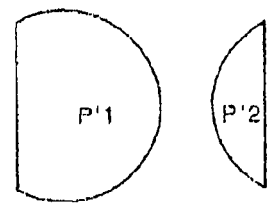

Further to this, FIGS. 5A to 5D show that the biprism divides the transmitted beam 60 into two sub-beams. The outlet pupil of the counter-measure device is split into two parts, one passing through the prism 11 (pupil P1). The other passing through the prism 12 (pupil P2). FIGS. 5A and 5C correspond to the situation of FIG. 3A. FIGS. 5B and 5D correspond to the situation of FIG. 3B. FIGS. 5A and 5B thus show that the two sub-pupils entering P1 and P2 vary as a function especially of the angle of orientation β of the biprism 10. FIGS. 5C and 5D show that the effect of each prism is to invert the pupil and to offset it differently for each angle of incidence causing modification of the direction of the outlet sub-pupils P'1 and P'2.

If the two prisms 11 and 12 are made of the same material, the difference in pitch 13 causes interference between the beams 61 and 62. Such interference is highly annoying for tracking and counter-measure of threats. The dark interference zones can in fact result in non-detection zones of the threat and/or in non-jamming zones. Also, the fact that the difference in pitch varies when the head is used, especially as a function of the angle of orientation of the biprism, makes tracking and counter-measure of threats even more delicate.

Consequently, the two sub-parts of the beam 60 must be made incoherent so as to avoid interference between the two parts of the beams exiting from the biprism.

For this, FIG. 6 shows that the two prisms 11 and 12 of the orientation head are made of materials having different diffraction indices, which allows the optical paths of the beams passing through the prism 11 and the prism 12 to be different. The significant difference (and as a consequence much greater than the coherent length of the light used) in optical path makes the two sub-parts of the beam 60 incoherent.

The delay in optical path introduced by the difference in indices of the materials of the prisms 11 and 12 is at least greater than the coherent length of the laser source 5 in all useful positions of the biprism.

The choice of the couple of materials preferably satisfies a number of needs.

First, the difference in materials indices must cause a sufficient optical path difference to ensure incoherence of the two sub-beams for all angles of use of the orientation head. The optical path difference due to the materials indices must be greater than the sum both of the coherent length of the laser source and also of the advance in optical path between the two pupils. The value of the supplement of optical path caused by the difference in indices is greater than said sum in the worst case of use of the head. In this way, the incoherence of the two sub-beams leaving the orientation head is assured, irrespective of the angular position of the deflected transmitted beam.

Second, the couple of materials is preferably selected such that the materials substantially have thermal dilation coefficients relatively close to one another. This constraint is veritably important only in the event where one prism is stuck to the other. In fact, for military applications, the device must be utilisable from −40° C. to +70° C., or even from −54° C. to +85° C. (to take into consideration possible storage). If the prisms 11 and 12 dilate too differently, proper functioning of the biprism—and as a consequence of the orientation head—will be altered.

It is noted that the source 5 laser preferably has a coherent length, typically equal to a few centimeters.

If ΔL is called the difference in pitch between a beam passing through a prism relative to a beam passing through another prism, this therefore first gives the relation: $\Delta L \propto \Delta n$ for a given dimension of the biprism.

It should be:

$$\Delta L \geq L_c$$

where $L_c$ is the coherent length of the laser source.

The materials used in infrared have a highly varied index range. A couple of materials can be selected, with one material having a strong index and one material having a low index.

The range of materials used is wide enough to select an optimal couple as a function of the real data of the problem. Table 1 combines several examples of main materials with the values of their refraction index for a wavelength of 4 µm.

TABLE 1

| | | | | Material | | | | |
|---|---|---|---|---|---|---|---|---|
| Ge | Si | ZnSe | KrS$_5$ | Diamond | ZnS | AgCl | CsI | PbF$_2$ |
| Index | | | | | | | | |
| 4.03 | 3.42 | 2.43 | 2.38 | 2.38 | 2.25 | 2 | 1.74 | 1.72 |

| | | | | Material | | | | |
|---|---|---|---|---|---|---|---|---|
| MgO | Sapphire | CsBr | KBr | NaCl | KCl | CaF$_2$ | KrS$_6$ | MgF$_2$ |
| Index | | | | | | | | |
| 1.71 | 1.67 | 1.67 | 1.54 | 1.52 | 1.47 | 1.41 | 1.38 | 1.35 |

It is noted that FIG. 9 schematically illustrates the trajectory for an angle of incidence of the beam 51 of 45° and for an angle of incidence of the beam 52 of 20°. From top to bottom in FIG. 9, the different materials considered for the prism 11 are germanium (Ge), silicon (Si), zinc selenide (ZnSe), zinc sulphide (ZnS) and sapphire. Using for example symmetrical a prism 11 allows the transmitted beam 61 or 62 to emerge with an angle at equal to the incident one αi 51 or 52

FIG. 9 also shows that the deviation introduced by each of the two prisms is independent of the materials index used, only the transverse offset of the beams will be affected (but is without consequence, given the application). It is graphically evident that the run in the material varies slightly as a function of the angle of incidence and of the material (the more the index is raised the shorter the run seems), but these variations remain low and do not compensate the variation in optical path which is essentially bound to the difference in index. The fact that the angle of deviation, irrespective of the incident angle, is independent of the material is associated with the fact that the prism is symmetrical relative to the base. The operating condition of the biprism for deviation to be identical in the two prisms is that the angle at the apex is right.

Table 2 of the following page illustrates examples of possible couples of materials. The differences in index of the couple are indicated in the upper half of Table 2, with the differences in thermal dilation coefficients being indicated in the lower half.

TABLE 2

| | As$_2$S$_3$ | Irtran1 MgF2 | Irtran2 ZnS | Irtran3 CaF2 | Irtran4 ZoSe | Irtran5 MgO | Irtran6 CdTe | Se | Si | Ge | Sapphire (Al$_2$O$_3$) | Quartz (SiO$_2$) |
|---|---|---|---|---|---|---|---|---|---|---|---|---|
| As$_2$S$_3$ | X | 1.06 | 0.17 | 1.01 | 0.02 | 0.73 | 0.27 | 0.07 | 1.02 | 1.67 | 0.69 | 0.91 |
| Irtran1 MgF2 | 0.04 | X | 0.89 | 0.05 | 1.08 | 0.33 | 1.33 | 1.13 | 2.08 | 2.73 | 0.37 | 0.15 |
| Irtran2 ZnS | 0.04 | 0.01 | X | 0.84 | 0.19 | 0.56 | 0.44 | 0.24 | 1.19 | 1.84 | 0.52 | 0.74 |
| Irtran3 CaF2 | 0.04 | 0.01 | 0.04 | X | 1.03 | 0.28 | 1.28 | 1.08 | 2.03 | 2.68 | 0.31 | 0.10 |
| Irtran4 ZnSe | 0.05 | 0.01 | 0.00 | 0.03 | X | 0.75 | 0.25 | 0.05 | 1.00 | 1.65 | 0.71 | 0.93 |
| Irtran5 MgO | 0.04 | 0.00 | 0.01 | 0.03 | 0.01 | X | 1.00 | 0.80 | 1.75 | 2.40 | 0.04 | 0.18 |
| Irtran6 CdTe | 0.05 | 0.01 | 0.00 | 0.04 | 0.01 | 0.01 | X | 0.20 | 0.75 | 1.40 | 0.96 | 1.18 |
| Se | 0.03 | 0.07 | 0.08 | 0.05 | 0.08 | 0.07 | 0.09 | X | 0.95 | 1.60 | 0.76 | 0.98 |
| Si | 0.06 | 0.02 | 0.01 | 0.05 | 0.01 | 0.02 | 0.00 | 0.09 | X | 0.65 | 1.71 | 1.93 |
| Ge | 0.06 | 0.02 | 0.00 | 0.04 | 0.01 | 0.02 | 0.00 | 0.09 | 0.00 | X | 2.36 | 2.58 |
| Sapphire (Al$_2$O$_3$) | 0.05 | 0.01 | 0.00 | 0.04 | 0.01 | 0.01 | 0.00 | 0.09 | 0.01 | 0.00 | X | 0.22 |
| Quartz (SiO$_2$) | 0.03 | 0.01 | 0.02 | 0.02 | 0.02 | 0.01 | 0.02 | 0.07 | 0.03 | 0.02 | 0.02 | X |

For a coherent length of the source 5 equal to 20 mm, and for a prism having sides of 50 mm, the condition of non-coherence between the beam passing through each prism is verified as soon as the difference in index of the couple is substantially greater than 1. This value obviously depends of the coherent length of the source and des dimensions of the prism.

Materials which exhibit substantially equal thermal dilation coefficients should be selected. This condition is verified as soon as the difference in dilatation coefficients of the couple is substantially less than 0.02, and more preferably less than 0.01. In selecting germanium for one of the prisms (index n equal 4 to 4 µm), the condition on the index is almost always verified, irrespective of the other material selected. A material having a thermal dilation coefficient close to that of germanium can therefore be selected as the other material of the couple.

The preferred couples of Table 2 are therefore:
silicon—ZnS;
silicon—sapphire,
germanium—ZnS; or
germanium—ZnSe.

With such couples, the difference in index is greater than 1.1. The difference in elongation in the range of use of the head is less than 10 µm.

It is also possible to provide couples
germanium—CdTe: or
germanium—sapphire.

With such couples, the difference in index is also greater than 1.1. The difference in elongation in the range of use of the head is less than 2 µm.

It should be noted that even the couple of the most current and most used materials, namely germanium and silicon, can be suitable.

The preceding developments describe the orientation of the head in elevation. To be able to cover an angular space at least of 2 $\pi$ steradians, another axis of rotation of the head is required.

FIGS. 3 and 6 preferably show that an entry axis of the system is parallel to the base of the biprism 10. The entry axis is joined to an axis of rotation AA passing through the geometric centre of the biprism 10. The axis AA is the azimuth orientation axis and makes the prism rotate about the entry axis for the orientation of the azimuth transmitted beam 60. In zenith sight, the axis AA is parallel to the face 112. The angle $\alpha$ de deflection of the beams of the azimuth beam 50 is the same as the angle of rotation of the azimuth prism $\alpha$ about the axis AA.

To permit rotation about the two axes AA and BB the biprism is mounted on two supports 19 covering the two faces corresponding to the base of the biprism 10. Each support 19 is mounted in rotation in a fork 15 comprising two arms 16. A drive motor in rotation in elevation is described hereinbelow in the present description.

The arms 16 of the fork 15 comprise a pivot link with the supports 19 so as to allow rotation of the biprism 10 about the axis BB between the arms of the fork, as shown in FIGS. 6 and 7. The main axis of the fork 15 is joined to the axis AA, and is therefore parallel to the base of the biprism 10. A drive motor in azimuth rotation allows this whole mechanism to be driven about the axis AA.

Several embodiments of displacement means of the biprism are possible.

A first embodiment provides a foot 14 attached both to a support 19 of the biprism by a link 141 and to a means 135 on which the foot 14 can slide. In this embodiment, movement transmitted by a motor located near means 135 is transmitted to the biprism 10 by way of the foot 14.

A second embodiment provides that the orientation of the biprism 10 is given by a motor in elevation situated on the axis BB. Therefore, the foot 14 is no longer necessary, simplifying mechanical assembling of the head.

The mechanical pieces have reduced inertia and appropriate motorisation to enable rapid shifting of the biprism. There is no unbalance in the assembly according to the invention.

FIGS. 6 and 7 show that the device comprises a hood 17 for protection of the biprism and the rest of the device. The hood 17 has a substantially hemispherical shape. It mainly comprises a material 18 transparent to infrared beams emitted or received by the tracking and counter-measure device. The material 18 covers a minimal angle of 180° in elevation on the hood 17 according to a plane of symmetry of the hood. The hood 17 turns at the same time as the azimuth fork 15. The whole device is driven about the axis AA to ensure azimuth scanning.

The device is adapted both to carry out tracking of a missile and to effect counter-measure of the missile. The tracking phases can be successive or intermittent, according to application and threat.

FIG. 8 shows that to have complete covering of space, two devices according to the invention can be mounted on two opposite sides of an aircraft 1. The devices according to the invention are very compact and furtive. They are mechanically balanced—especially for the biprism and the head—meaning that they are reasonably insensitive to the vibrations of an engine or aircraft blades. The head itself does not cause vibrations or destabilisation of the line of sight.

It is understood that the preceding developments apply to military aircraft, for example transport planes or attack and transport helicopters. Examples of threats are ground-to-air, and air-to-air missiles. The multi-threat scenario corresponding to a salvo of several missiles is also envisaged. The preceding developments can also apply to civil aircraft, such as for example long-haul planes, against terrorist threats. It is also understood that the preceding developments apply to other types of vehicles, such as tanks or trucks, but also to civil or military building threatened by missiles.

The invention claimed is:

1. A device for counter measure and tracking of threats in the form of a homing-head missile, comprising an orientation head for receiving a coherent incident light beam and deflecting it to produce a transmitted beam, wherein the orientation head comprises a biprism including two prisms made of different materials and adapted for dividing the transmitted beam into two sub-beams, the refractive index difference between the prisms being adapted for introducing an optical path difference between the two sub-beams which is greater than the coherent length of the incident beam.

2. The device as claimed in claim 1, in which the prisms have a right-angle isosceles triangle base.

3. The device as claimed in claim 1, in which the difference in refraction index between the prisms is substantially greater than 1.

4. The device as claimed claim 3, in which the couple of materials for the prisms is selected from the couples of silicon-ZnS or silicon-sapphire or germanium-zinc sulphide or germanium-zinc selenide or germanium-CdTe or germanium-sapphire.

5. The device as claimed in claim 1, in which the difference in thermal dilation coefficient between the prisms is less than 0.02.

6. The device as claimed in claim), in which the head is mounted in azimuth rotation about an axis parallel to the base of the biprism and passing through the geometric centre of the biprism.

7. The device as claimed in claim 6, in which a protective hood of the biprism is mounted mobile in azimuth rotation.

8. The device as claimed in claim 1, in which the biprism is mounted in rotation in elevation about an axis perpendicular to its base and passing through its geometric centre.

9. The device as claimed in claim 8, in which the biprism is mounted on a support mobile in rotation about the axis of rotation in elevation in a fork.

10. The device as claimed in claim 1, comprising an infrared laser source of coherent length of the order of magnitude of a centimeter.

* * * * *

UNITED STATES PATENT AND TRADEMARK OFFICE
CERTIFICATE OF CORRECTION

PATENT NO.         : 8,698,667 B2
APPLICATION NO.    : 11/885093
DATED              : April 15, 2014
INVENTOR(S)        : Julien Aragones, Francois Dufresne de Virel and Jacques Robineau It is certified that error appears in the above-identified patent and that said Letters Patent is hereby corrected as shown below:

In the Claims

Column 11, Claim 6, line 1, delete "claim)" and insert --claim 1--.

Signed and Sealed this
Fourteenth Day of October, 2014

Michelle K. Lee
*Deputy Director of the United States Patent and Trademark Office*